(12) United States Patent  (10) Patent No.: US 7,826,909 B2
Attarwala  (45) Date of Patent: Nov. 2, 2010

(54) DYNAMIC MODEL PREDICTIVE CONTROL

(76) Inventor: Fakhruddin T Attarwala, 364 Cherry Hill Rd., Princeton, NJ (US) 08540

( * ) Notice: Subject to any disclaimer, the term of this patent is extended or adjusted under 35 U.S.C. 154(b) by 224 days.

(21) Appl. No.: 11/999,056

(22) Filed: Dec. 4, 2007

(65) Prior Publication Data

US 2008/0140227 A1   Jun. 12, 2008

(51) Int. Cl.
*G05B 13/02* (2006.01)
(52) U.S. Cl. ...................................................... 700/45
(58) Field of Classification Search .................. 700/29, 700/30, 32, 37, 44, 45
See application file for complete search history.

(56) References Cited

U.S. PATENT DOCUMENTS

| | | | | |
|---|---|---|---|---|
| 4,616,308 | A | * | 10/1986 | Morshedi et al. .............. 700/39 |
| 5,457,625 | A | * | 10/1995 | Lim et al. ..................... 700/29 |
| 5,758,047 | A | * | 5/1998 | Lu et al. ....................... 700/28 |
| 6,950,711 | B2 | * | 9/2005 | Havener et al. ............... 700/28 |

OTHER PUBLICATIONS

Muske et al.; "Model Predictive Control with Linear Models"; Feb. 1993; vol. 39, No. 2, AIChE Journal; pp. 262-287.*

* cited by examiner

*Primary Examiner*—Albert DeCady
*Assistant Examiner*—Chad Rapp

(57) ABSTRACT

A method of dynamic model predictive control is presented in which both steady state optimization and dynamic moves calculation of the manipulated variables are determined together as part of one optimization solution (211). The method combines steady state optimization and dynamic move calculation such that the steady state optimal targets are determined consistent with the dynamic moves and the resulting dynamic response of the process so that the controlled variables do not violate their low/high limits in both steady state and dynamically. The method utilizes what is described as high limit dynamic violation variables and low limit dynamic violation variables corresponding to each of the controlled variables. The method offers a unique capability of mixing a part dynamic optimization with a part steady state optimization as it relates to application of a large model predictive control under varying situations, in particular at or near constraints violations that can be done dynamically in real time for improved and robust control performance without having to change the controller tuning.

16 Claims, 8 Drawing Sheets

Dynamic Model Predictive Control-Present Invention

Fig 1 Prior Art MPC

Fig 2 Dynamic Model Predictive Control-Present Invention

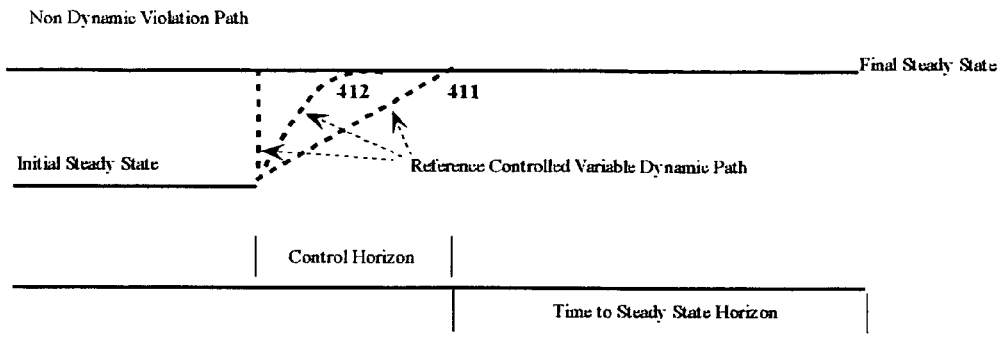
Fig 4.1 An Illustration of Steady State Optimization and Dynamic Violation of Controlled Variable Formulation
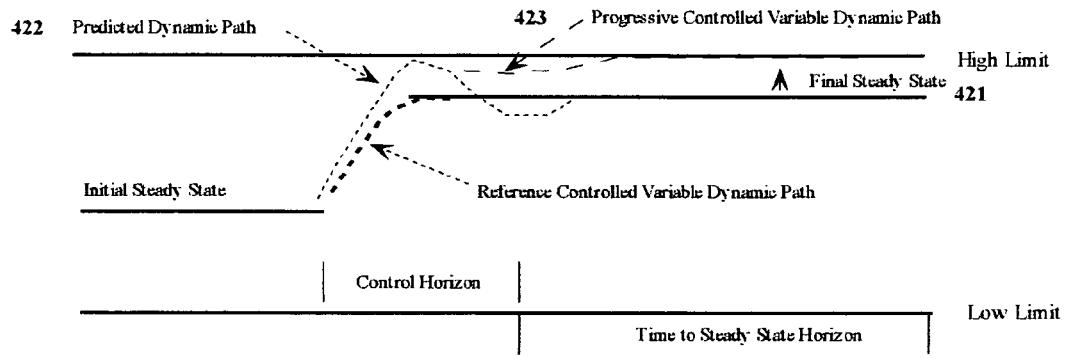
Fig 4.2 Avoidance of Dynamic Violation of Controlled Variable by Present Invention
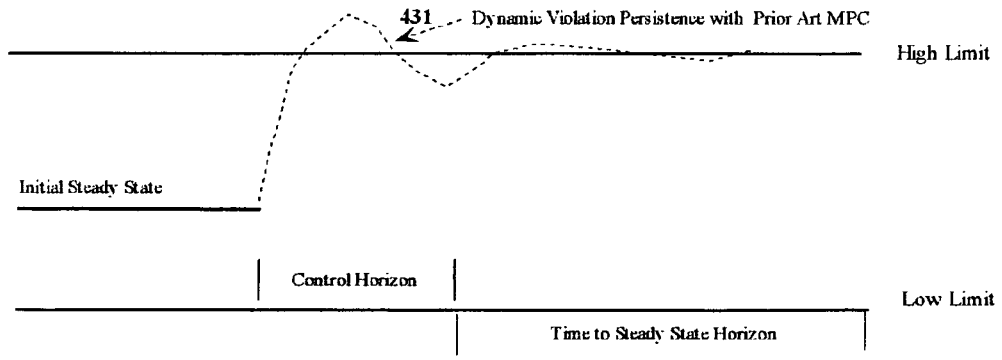
Fig 4.3 Prior Art MPC Dynamic Violation of Controlled Variable

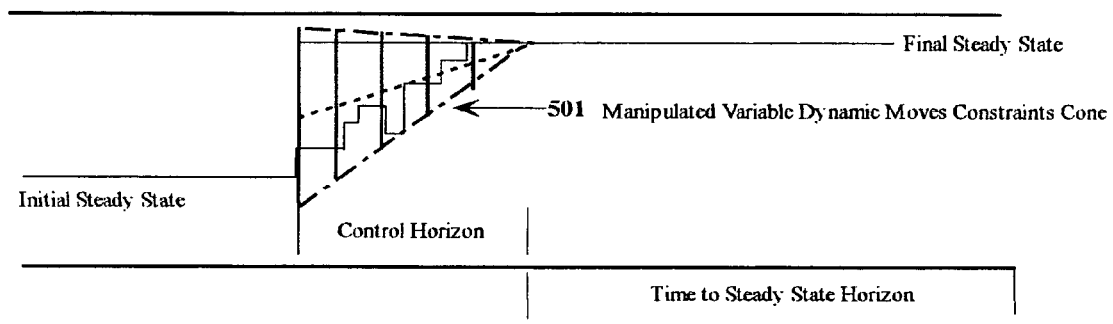
Fig 5 Manipulated Variable Moves Constraint Cone

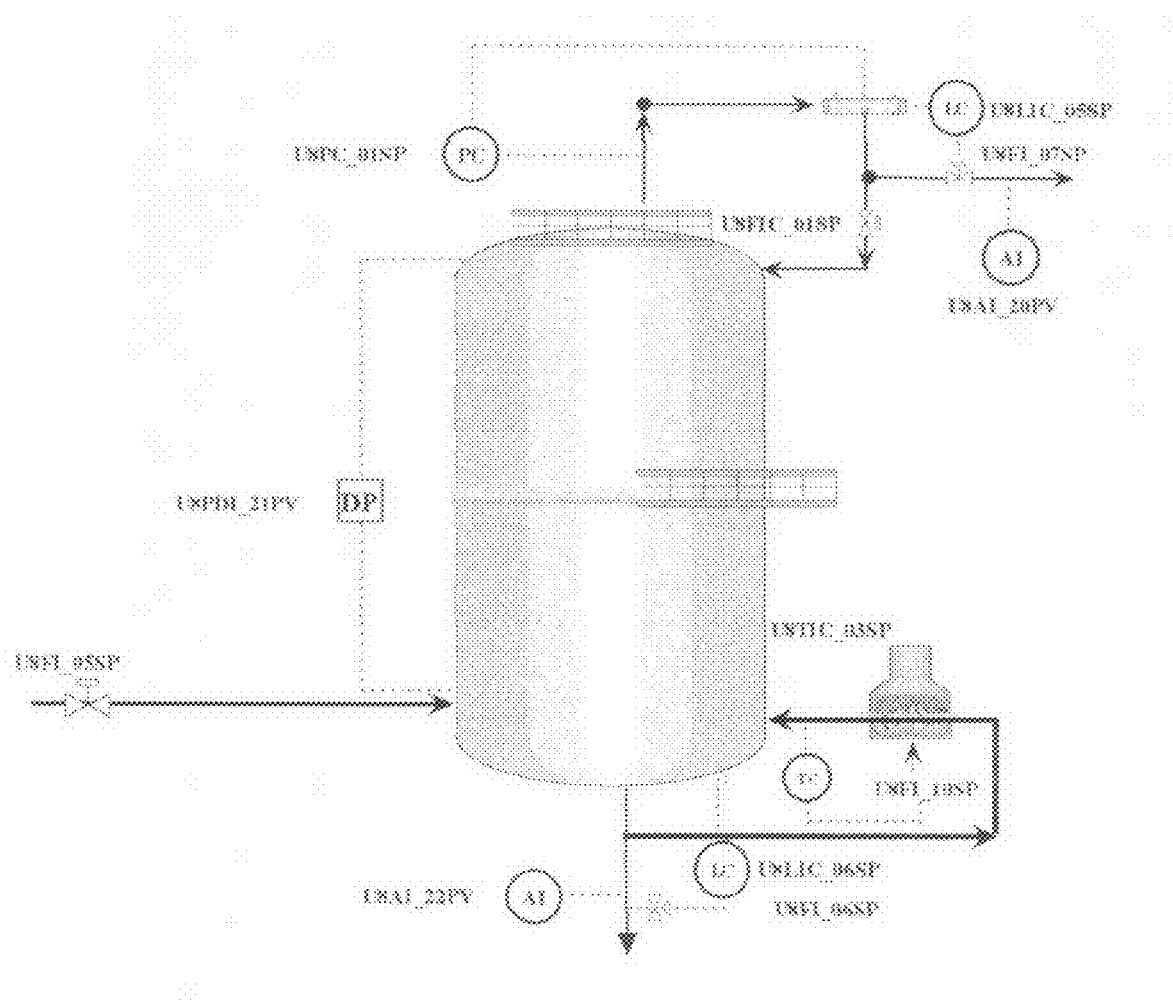
Fig 6 DeButanizer Schematic Process Flow Diagram

| ProcessVarID | ProcessVarName | ProcessVarDesc | EngUnit |
|---|---|---|---|
| 147 U8AI_20PV | Overhead Product ImPurity (iC5+) | %mole |
| 148 U8AI_22PV | Bottom Product ImPurity (iC4) | %mole |
| 160 U8AI05_PV | Feed Quality to De4 | % |
| 150 U8FI_06SP | Feed Flow Controller Set Point | MBLD |
| 156 U8FI_06OP | BottomPrd Controller Output | % |
| 154 U8FI_06PV | Bottom Product Flow | MBLD |
| 155 U8FI_06SP | Bottom Product Flow SP | MBLD |
| 157 U8FI_07OP | Top Prd Controller Output | % |
| 153 U8FI_07PV | Top Product Flow | MBLD |
| 158 U8FI_07SP | Top Product Flow SP | MBLD |
| 156 U8FI_10OP | Fuel Gas Controller Output | % |
| 179 U8FI_10PV | ReboilerTempControllerFuelFlowPV | MFT3HR |
| 164 U8FI_10SP | Reboiler Fuel Gas Flow | MFT3HR |
| 165 U8FIC_01OP | Top Reflux Flow Controller Output | % |
| 165 U8FIC_01PV | Top Reflux Flow Controller PV | MBLD |
| 161 U8FIC_01SP | Top Reflux Flow Controller Set Point | MBPD |
| 170 U8LIC_05PV | Top Level | % |
| 173 U8LIC_05SP | Top Level | % |
| 171 U8LIC_06PV | Bottom Level | % |
| 174 U8LIC_06SP | Bottom Level | % |
| 149 U8PDI_21PV | Column Pressure Differential | psia |
| 163 U8TI_03PV | FeedTempInlet | degF |
| 159 U8TIC_03PV | ReboilerTemperature Controller PV | degF |
| 162 U8TIC_03SP | ReboilerTemperature Controller Set Point | degF |
| 356 U8PC_01SP | AbsOvhdPressure | psig |
| 357 U8PC_01PV | AbsOvhdPressure | PSIG |
| 358 U8PC_01OP | AbsOvhdPressure | % |
| 366 U8FI_06PV | Feed Flow Controller PV | MBLD |
| 367 U8TCFI_06PV | Reboiler Feed to TC Feed Flow Controller PV | MBLD |
| 368 U8TIC03PV | InletToBtmReboiler PV | degF |
| 369 U8TCTIC03PV | Feed Temp to Rbrl | degF |
| 370 U8FIRBRPV | Reboiler Feed PV | MBLD |

Fig 7 Process Variables of DeButanizer Example

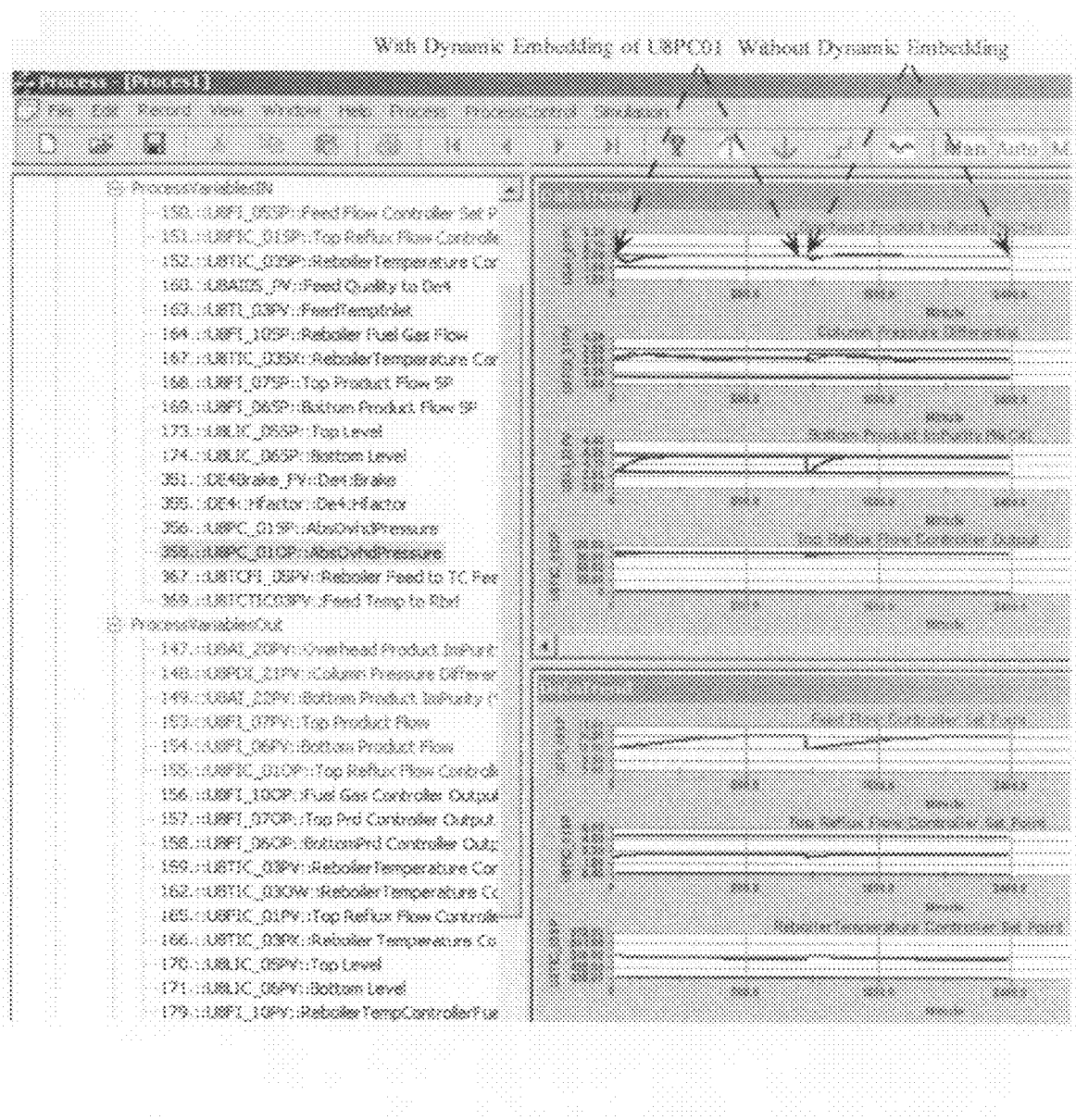
Fig 8 Comparison of Performance of With and Without Dynamic Embedding of U8PC01

DYNAMIC MODEL PREDICTIVE CONTROL

FEDERALLY SPONSORED RESEARCH

Not Applicable

SEQUENCE LISTING OR PROGRAM

Not Applicable

BACKGROUND

1. Field of Invention

This invention relates to determination of dynamic moves of the manipulated variables in a model predictive controller, specifically to as it relates to the method of calculation in which the steady state optimization and the dynamic moves calculation are done simultaneously as part of one optimization solution.

2. Background of the Invention

Since its inception in early 1980, the basic formulation of Model Predictive Control (MPC) has involved a two-step method of solution. The first step of constrained steady state optimization solution involves determination of optimal steady targets for both the controlled variables and the manipulated variables based on the currently predicted future steady state as per the effects of past-manipulated variables moves. The second step of the solution of dynamic move calculation in which the dynamic moves of the manipulated variables are calculated so as to derive the process to the optimal steady state targets. However, the dynamic moves are calculated as unconstrained least square solution to minimize the square of the predicted error of the controlled variables over a prediction horizon by a number of future-moves in the manipulated variables over a control horizon or some variation of this but not as explicit constrained dynamic solution. Further, by adopting a receding horizon method, both these two-steps of solution are performed repeatedly to continually update both the optimal steady state targets and the dynamic moves. One of the key deficiencies of this 2-step solution is that dynamically the controlled variables values can violate their high/low limits even though the steady state solution does not. The dynamic move calculation being an unconstrained solution does not ensure that the controlled variables do not violate their respective high/low limits while moving towards the steady state targets as determined earlier by the steady state optimization step. Consequently, in the prior art MPC, dynamic performance of a MPC can drastically change under changing process condition circumstances. Furthermore, any attempt to improve the poor performance under a set of process condition would necessitate say a change in the controller tuning, which may subsequently produce poor performance under some other process condition. The prior art MPC are not robust in their performance to a wide range of operating conditions.

In practice, to circumvent this, various forms of tuning weights for both the controlled variables and the manipulated variables are used. Particularly, for the dynamic move calculation, controlled variables weights and manipulated variables weights are required to ensure that the dynamic violations of the controlled variables are minimized. Typically, increasing manipulated variables weights reduce the dynamic violation of the controlled variables by reducing the size of the move and thus slowing down the rate of approaching the optimal steady state targets. A certain amount of tuning weights of the manipulated variables is essential to maintain dynamic stability of the process under control. However, in practice the effectiveness of the tuning weights is rather limited and very much dependent on the range of operation. One set of tuning weights values cannot ensure that dynamic violation of the controlled variables will be the same under changing operation conditions. In practice, therefore, the tuning weights are set based on a compromise whereby the dynamic violation of the controlled variables is achieved by accepting sluggish process performance. Therefore, to maintain the responsiveness and the stability of the process under control, the tuning weights are required to be adjusted from time to time. It is a trial and error method. A poorly tuned MPC would perform with excessive dynamic violation of the controlled variables under changing disturbance conditions. In a modest size MPC, it is not easy to set the tuning weights that would perform consistently at all times. Intrinsically, the 2-step method of solution of the prior art includes what can be characterized as a positive feedback loop of the effect of the unconstrained dynamic move on the steady state optimization and vice versa. This makes the prior art MPC more vulnerable to self-induced instability due to certain amount of dynamic changes in measured and unmeasured disturbances including the tuning weights of both the controlled variables and the manipulated variables.

This 2-step method of solution has been the bulwark of the MPC implementation in the industry over last 25 years. From its first introduction in early 1980 at Shell Development Company to this day, the method of solution remains basically the same. The prior art patent, U.S. Pat. No. 5,758,047 by Lu et al relates to a 2-step solution in which the dynamic moves are solved in second step by way of an augmented problem in which the first step steady state targets and the dynamic moves calculation are harmonized. Basically, Morshedi et al disclose the same 2-step process of calculation relating to dynamic moves in another earlier U.S. Pat. No. 4,616,308.

SUMMARY

A key problem with the prior art MPC is that they typically control the dynamic violation of the controlled variables solely by the tuning weights.

An object of the present invention is to thus provide a system and method, which would explicitly constrain for dynamic violation of the controlled variables in arriving at the manipulated variables moves resulting in improved and robust control performance.

DETAILED DESCRIPTION

Figure 1:
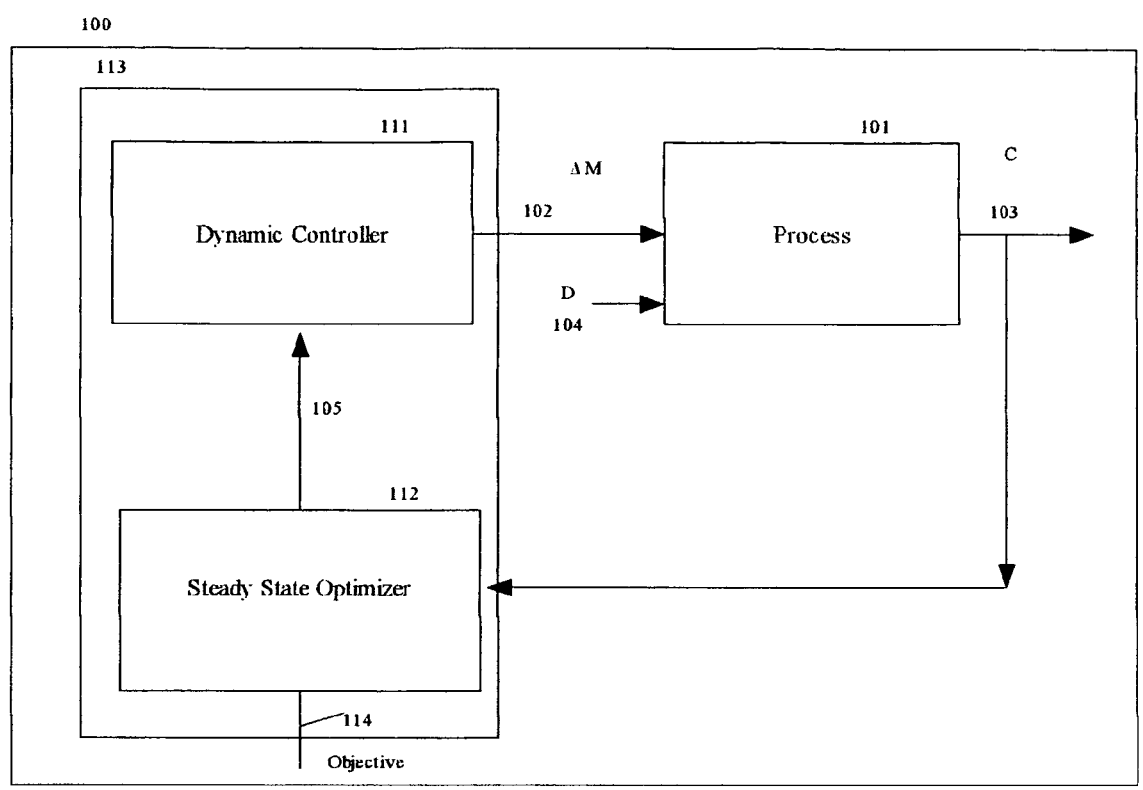
FIG. 1 is a block diagram illustrating the two-step solution of the prior art MPC

In FIG. 1, a block diagram illustrating the two-step prior art MPC process control is shown. The process 201 is characterized by a number of what is generally known as controlled variables (process output variables) 203, manipulated variables (process input variables) 202 and disturbance variables (process uncontrolled input variables) 204. The process relate to any form of operation in which the effects of changes in the manipulated variables and the disturbance variables produce some changes in the controlled variables over a period of time. Typically, the changes in the controlled variables settle down to a constant value or near constant value including at a constant rate of change is generally known as steady state. A steady state represents final state of the process following the changes in the manipulated variables and/or the disturbance variables. For a stable process, the steady state is achieved when the rate of change of its output variables becomes zero for inherently stable process or at the rate of change of its output attain a constant value for open-loop unstable process, such as liquid accumulator, the steady state is achieved when the rate of change of its output variables attain a constant value. For the purpose of the disclosure of the present invention both these types of process are considered to attain steady state in their respective manner. However, for sake of exposition, hereon only the inherently stable process will be considered without loss of generality.

The process 101 characterized in FIG. 1 can be a simple process involving one input variable and one output variable or a more complex process involving multiple input variables and multiple output variables. The problem of dynamic violation of the controlled variables become much more difficult and challenging as the size of the process become large with the prior art MPC.

In FIG. 1, 113 constitutes what is commonly known in the prior art as Model Predictive Control comprising a steady state optimizer and a dynamic controller. The steady state optimizer 112 first calculates optimal steady state targets of the manipulated variables and the controlled variables based on the predicted steady state as per the previous moves of the manipulated variables, changes in the disturbance variables and the feedback of the controlled variables. The steady state optimal targets are then passed down to the dynamic controller to determine the future moves in the manipulated variables that would cause the process to attain the target steady state. The dynamic controller 111 performs this as one way or another a least square minimization of the predicted controlled variables from their steady state targets. The first move of the calculated future moves 102 of the manipulated variables is then applied to the process to affect it. This cycle of calculation is repeated and the process progressively attains the final steady state.

Figure 3:
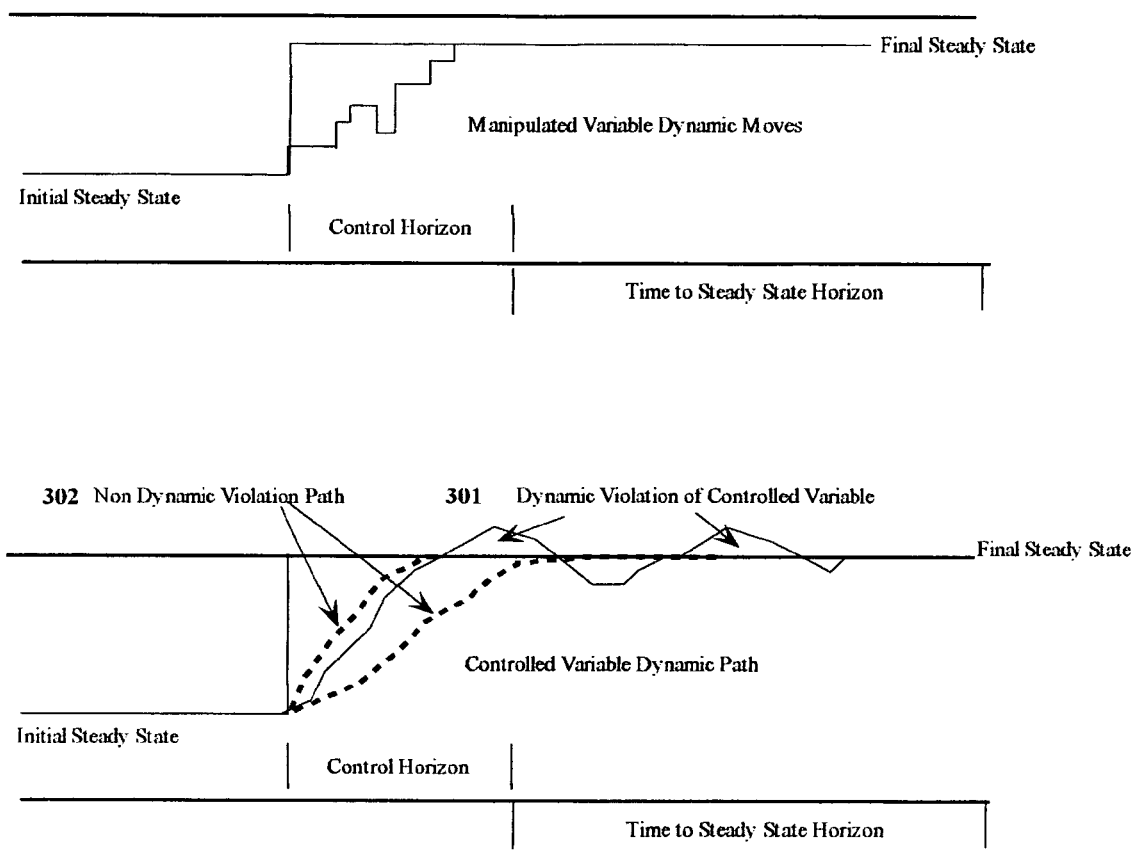
FIG. 3 is illustration of dynamic violation of a controlled variable FIG. 4.1 is an illustration of Dynamic MPC FIG. 4.2 is an illustration of Dynamic MPC with the predicted dynamic violation constraining steady state optimal target FIG. 4.3 is an illustration of the prior art MPC with the predicted dynamic violation NOT constraining steady state optimal target FIG. 5 Manipulated Variable Moves Constraint Cone FIG. 6 DeButanizer Schematic Process Flow Diagram FIG. 7 Process Variables of DeButanizer Example FIG. 8 Comparison of Performance of With and Without Dynamic Embedding of U8PC01

FIG. 3 illustrates atypical problem of dynamic violation of a controlled variable 301 in relation to steady state optimization and dynamic moves of the manipulated variable as manifest with the prior art MPC. FIG. 3 also illustrates what is expected or desired as non-violating CV path 302 as per the present invention. The non-violating CV path are determined as part of the combined optimization solution that includes steady state optimization and dynamic control moves calculation as per the present invention as described below.

Figure 2:
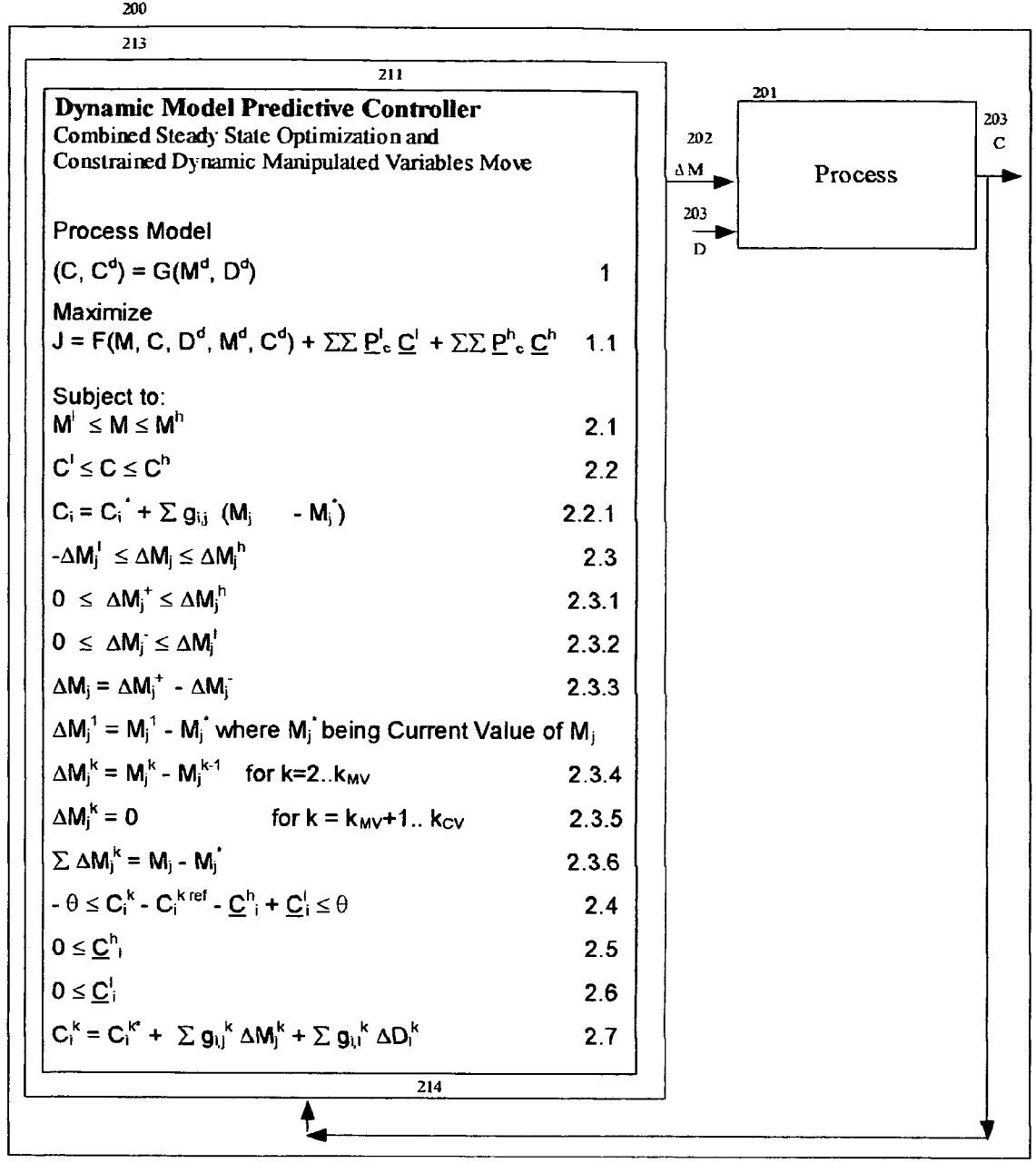
FIG. 2 is a block diagram illustrating Dynamic MPC as per the present invention

In FIG. 2, an improved MPC is proposed in which the 2-step of the prior art MPC is merged into one-optimization step solution.

It is assumed that the process is characterized by a set of variables, such as $M^d$ represents dynamic values of manipulated variables
$C^d$ represents dynamic values of controlled variables
$D^d$ represents dynamic values of disturbance variables
M represents steady values of manipulated variables
C represents steady state values of controlled variables
D represents values of disturbance variables at initial time
At steady state, $C=C^d$, $M=M^d$
Further, it is assumed that
there are m number of manipulated variables,
there are c number of controlled variables,
there are d number of disturbance variables.

For most typical MPC applications, there are no future values of disturbance variables known or given, except past values and current value, in those cases, use of D would suffice. However, use of $D^d$ would recognize its use as D as done customarily in addition to including known/given future values. Hence in the formulation, where appropriate $D^d$ and D would be used interchangeably.

The process 201 is considered to be a dynamic system, and the controlled variables dynamic response is characterized by the following $$(C, C^d) = G(M^d, D^d) \qquad 1$$

Where G describes dynamic response of the controlled variables as $(C, C^d)$ to a given set of dynamic moves in $M^d$ and dynamic disturbance future changes in $D^d$. $(C, C^d)$ is considered to consist of steady state response as C and dynamic response as $C^d$. Of course, in the steady state of the process $C^d$ attains value of C. For the purpose of formulation, both C and $C^d$ are considered as separate where appropriate. In addition to variable $M^d$, for the purpose of steady state optimization, its steady state variable will be used as M. It is important to note that $D^d$ is essentially considered as external variables not determined by the optimization solution but rather affecting it. For typical, MPC application, $D^d$ relates to actual dynamic change as measured at the start of control cycle while for most part future dynamic changes in it considered to be unknown and hence zero. However, the formulation presented herein does permit a rather more interesting case wherein the dynamic changes in D in future can be included as further disclosed under further embodiment of the present invention.

The object of the dynamic MPC as proposed by the present invention is to optimize an objective function involving (C, $C^d$, M, $M^d$) subject to a set of constraints relating to the variables (C, $C^d$, M, $M^d$) with the process dynamics characterized by eqn 1 above, as stated below that would result in determination of optimal value of (C, $C^d$, M, $M^d$). Since, (C, $C^d$) being dependent variables, in essence the proposed dynamic optimization yields (M, $M^d$) as the optimal solution.

The objective function, J is to be maximized as in a general form as below and as an exemplary form as in Eqn 2.

$$J = F(M, C, D^d, M^d, C^d) + \Sigma\Sigma P^l_c C^l + \Sigma\Sigma P^h_c C^h \qquad 1.1$$

where F is some optimizing function for the process over the time horizon of time to steady state for the process. Thus, as formulated above, J is to be optimized in consideration of both steady state change and pertinent dynamic moves determined by the optimization process described further herein. However, in most practical applications, $F(M, C, D^d, M^d, C^d)$ is really of form $F(M, C, D)$, not including dynamic variables. Those skilled in the art would appreciate that not including dynamic variables $(M^d, C^d)$ does not really impair the formulation presented here forth. Thus, hereon, we can assume the optimizing function to be of form F(M, C, D) without loss of generality.

For the purpose of exposition but not limiting, a simple form of the optimizing function will be followed hereon as $$J = P_m M + P_c C + \Sigma\Sigma P^l_c C^l + \Sigma\Sigma P^h_c C^h \quad \quad 2$$

Eqn 2 incorporates steady state optimization function and sum of all penalty of all low/high dynamic violation of the controlled variables. It is understood that those skill in the art would anticipate the various alternate forms of $F(M, C, D^d, M^d, C^d)$ that could be incorporated within the optimization process described herein. For the sake of exposition but not limiting, hereon G is considered to be a linear dynamic model of step response (discrete time) type commonly used in model predictive control field. That is to say, using a discrete coefficient dynamic model for the process, the steady state value of the controlled variables is determined by $$C_i = C_i^* + \Sigma g_{i,j}(M_j - M_j^*) + \Sigma g_{i,l}(D_l - D_j^*) \quad \quad$$

And the dynamic value of the controlled variables is determined by $$C_i^k = C_i^{k*} + \Sigma g_{i,j}^k \Delta M_j^k + \Sigma g_{i,l}^k \Delta Dl_j^k$$

Subject to:

$$M^l \leq M \leq M^h \quad \quad 2.1$$

$$C^l \leq C \leq C^h \quad \quad 2.2$$

$$C_i = C_i^* + \Sigma g_{i,j}(M_j - M_j^*) \quad \quad 2.2.1$$

$$-\Delta M_j^l \leq \Delta M_j \leq \Delta M_j^h \quad \quad 2.3$$

$$0 \leq \Delta M_j^+ \leq \Delta M_j^h \quad \quad 2.3.1$$

$$0 \leq \Delta M_j^- \leq \Delta M_j^h \quad \quad 2.3.2$$

$$\Delta M_j = \Delta M_j^+ - \Delta M_j^- \quad \quad 2.3.3$$

$\Delta M_j^1 = M_j^1 - M_j^*$ where $M_j^*$ being Current Value of $M_j$ $$\Delta M_j^k = M_j^k - M_j^{k-1} \text{ for } k=2 \ldots k_{MV} \quad \quad 2.3.4$$

$$\Delta M_j^k = 0 \text{ for } k=k_{MV}+1 \ldots k_{CV} \quad \quad 2.3.5$$

$$\Sigma \Delta M_j^k = M_j - M_j^* \quad \quad 2.3.6$$

$$-\theta \leq C_i^k - C_i^{k\,ref} - C_i^h + C_i^l \leq \theta \quad \quad 2.4$$

$$0 \leq C_i^h \quad \quad 2.5$$

$$0 \leq C_i^l \quad \quad 2.6$$

$$C_i^k = C_i^{k*} + \Sigma g_{i,j}^k \Delta M_j^k + \Sigma g_{i,l}^k \Delta D_l^k \quad \quad 2.7$$

Where $M^l$ is low limit of the manipulated variables, M
$M^h$ is low limit of the manipulated variables, M
$C_l$ is low limit of the controlled variables, C
$C^h$ is high limit of the controlled variables, C
$\Delta M_j$ is dynamic move vector of manipulated variable, j
$\Delta M_j^+$ is positive dynamic move vector of manipulated variable, j
$\Delta M_j^-$ is negative dynamic move vector of manipulated variable,
$\Delta M_j^l$ is low limit of dynamic move of manipulated variable, j
$\Delta M_j^h$ is high limit of dynamic move of manipulated variable, j $\Delta M_j^k$ is dynamic control move of the manipulated variable $M_j$ at time k from now
$M_j$ is the optimal steady state target of the manipulated variable, j
$M_j^*$ is the current value of the manipulated variable, j
$Dl_j$ is the current value of disturbance variable, l
$D_l^*$ is the previous time period value of disturbance variable, l
$C_i^*$ is the currently predicted steady state value of the controlled variable
$C_i$ based on the recent past process condition
$C_i$ is the steady state value as determined by the optimization
$C_i^k$ is predicted value of Controlled Variable, $C_i$ at k time interval from now
$C_i^{k\,ref}$ is desired value of Controlled Variable, $C_i$ at k time interval from now, this is further explained below.
$C^h_i$ is high limit dynamic violation variables of the Controlled Variable, $C_i$
$C^l_i$ is low limit dynamic violation variables of the Controlled Variable, $C_i$
$C_i^{k*}$ is dynamic value of Controlled Variable $C_i$ at time k based on the past process condition
$g_{i,j}$ is the steady state gain of the step response model of the Controlled Variable, $C_i$ for a unit change in the manipulated variable, $M_j$
$g_{i,j}^k$ is the step response coefficient of the process model of Controlled Variable, $C_i$ for a unit change in the manipulated variable, $M_j$
$\Delta D_l^k$ is change in $D_l$ at time k
$g_{i,l_j}^k$ is the step response coefficient of the process model of Controlled Variable, $C_i$ for a unit change in said disturbance variable, $D_l$
$\theta$ is a permitted tolerance for deviation of the predicted dynamic value of the controlled variable from its reference path, a small number.
$P_m$ is the price value for the manipulated variables, typically a negative value representing cost and a positive value representing benefit.
$P_c$ is the price value for the controlled variables, typically a negative value-representing penalty and a positive value representing benefit.
$P^l_c$ is a large penalty value to be applied for the controlled variable violating its low limit dynamically
$P^h_c$ is a large penalty value to be applied for the controlled variable violating its high limit dynamically
k relates to future time from now on, $k=1 \ldots k_{MV} \ldots k_{CV}$
where $k_{MV}$ relates to the control horizon for manipulated variables moves, no manipulated variables to be applied beyond this time horizon so as to permit the controlled variables to attain their steady state,
whereas $k_{CV}$ relates to the time to steady state for the controlled variables, it would be the longest time to steady state for the changes in the manipulated variables, M plus the longest control horizon. For simplicity and sake of exposition, it will be assumed that it relates to the maximum time to steady state considering all of the responses of the controlled variables for the changes in all of the manipulated variables plus the longest of the control horizon of all of the manipulated variables.
$D^d$ is vector of dynamic values of disturbance variables in terms of its future values, for most part hereon D will be used in place of $D^d$ without loss of generality A brief description of the constraints elicited above is provided to further clarify the formulation. Constraints 2.1 are low/high limit constraints for the steady state optimal value of the manipulated variables.

Constraints 2.2 are low/high limit constraints for the steady state optimal value of the controlled variables.

Constraints 2.2.1 relate to the steady state change in the controlled variables C for the change in the steady state target of the manipulated variables, M Constraints 2.3 are low/high limit constraints for the control moves of the manipulated variables. It can be further split into positive dynamic move and negative dynamic move constraints as per 2.3.1-2.3.3. These become operative constraints in place of 2.3.

Constraints 2.3.3 are for the sum of control moves of the manipulated variables, j must equate to the difference of its optimal steady state target and its current value. This is to ensure that the dynamic moves lead the controlled variable to the optimal steady state value.

Constraint 2.3 can be further modified as follows $$-(1-k_{MV}/k)\Delta M_j^l \leq \Delta M_{j,k} \leq (1-k_{MV}/k)\Delta M_j^h \text{ for } k=1 \ldots k_{MV} \quad 2.3.7$$

Constraint 2.3.7 forms a cone like constraint profile 501 for maximum control moves, ensuring that most significant dynamic moves are applied earlier rather than later. An illustration of the manipulated variables moves constraint cone is depicted in FIG. 5. There are many other variant shaped cones that could be used for the purpose of defining dynamic constraint profile for each of the manipulated variables based on the requirement of dynamic response of the underlying process and its characteristics.

Constraints 2.4 are dynamic constraints of the controlled variables leading to the steady state target with a permitted tolerance for deviation from the desired reference path. $C_{i,k}^{ref}$ can be specified in many alternate ways. The simplest form is a linear path (see FIG. 4.1 411)

$$C_i^{k\,ref} = C_i^{1*} + r(C_i - C_i^{1*}) \text{ for } k=1 \ldots k_{ref}$$

$$C_i^{k\,ref} = C_i^1 \text{ for } k=k_{ref}+1 \ldots k_{CV} \quad 2.4.1$$

With r being set as desired. A first order response path (see FIG. 4.1 412) can also be used with appropriate formulation of 2.4.1. For sake of simplicity, hereon, a linear path is assumed. Typically, the reference path would terminate well before the time to steady state for the controlled variable, although it may be longer than the control horizon used for the manipulated variables.

It is important to note that constraint 2.4.1 provides for interlinking of the steady state optimal target with the dynamic path of the controlled variable. Further, constraints 2.4-2.7 essentially constrain the steady state optimal target so as to avoid the dynamic violation of the controlled variables low/high limits.

Constraints 2.5 relates to the dynamic violation variables of the controlled variables when violating the high limit. When not violating the high limit, these high limit dynamic violation variables will attain zero value. However, in case of a non-feasible solution, they will be non-zero and its value would indicate the extent of violation of the controlled variable at the respective time in future.

Constraints 2.6 relates to the dynamic violation of the controlled variables when violating the low limit. When not violating the low limit, these low limit dynamic violation variables will attain zero value. However, in case of a nonfeasible solution, they will be non-zero and its value would indicate the extent of violation of the controlled variable at the respective time in future.

Constraint 2.7 relates to the dynamic response of the controlled variables in response to the dynamic moves in the manipulated variables using what is commonly known in the art as the step response models.

Constraints 2.1-2.2.1 relate to the steady state optimization as commonly performed in the prior art MPC, whereas Constraints 2.3-2.7 are additional constraints specifically and explicitly relating to the dynamic moves of the manipulated variables and the dynamic response of the controlled variables that are amalgamated to yield a dynamic optimal solution in which the steady state targets are consistent with the avoidance/minimization of the deviation of the controlled variables from their low/high limits. All these constraints are combined into one optimization problem within the Dynamic MPC 211.

In contrast, in the prior art, the objective function solely relates to as J=F(M, C, D) with $M^d$ and $C^d$ determined separately exogenously.

Thus, the above formulation of the dynamic MPC would result in the optimal steady state of the process whilst ensuring that dynamic violation of the controlled variables is avoided when feasible or failing that the dynamic violations are minimized.

The optimization solution of the above will result in determination of dynamic moves for the manipulated variables along with the optimal steady state targets for the variables. The solution thus obtained would represent a one-step solution of both the optimal steady state targets and the dynamic moves for the manipulated variables where the dynamic violation of the controlled variables from their limits are avoided completely when feasible or else its minimized subject to the penalty used for the violations. By adjusting the relative values of the penalty for the high/low dynamic violation variables with time as well as relative to the other controlled variables, the extent and the behavior of the dynamic violation of controlled variables can be defined.

Interestingly, as stated above, there are no tuning parameters for the manipulated variables. The prior art MPC involve tuning weights for both controlled variables and manipulated variables, in steady state optimization as well as in the dynamic control move calculation. In the present invention, no tuning weights for the manipulated variables are required, tuning weights relating to the controlled variables are only required. By explicitly including the dynamic violation of the controlled variables in the combined solution of the optimal steady state targets and the dynamic moves, the manipulated variables tuning weights of the prior art MPC is eliminated entirely. With less number of tuning weights, the tuning of Dynamic MPC will be simpler and more effective. In the prior art, in-lieu of explicit dynamic violation of the controlled variables in determining the manipulated variables dynamic moves, various forms of tuning weights are devised for the manipulated variables to control the dynamic violation of the controlled variables. The manipulated variables tuning weights are at best set in an ad hoc manner requiring frequent revisions.

In the present invention, by embedding the dynamic moves calculation within the steady state optimization, as a direct consequence, the steady state part of the solution acts to hold back the optimizer pushing too hard towards the final steady state. It lets the process work through its dynamic in closed loop and let the process attain the final steady state gradually at the maximum rate of change without violating the controlled variables limits dynamically. However, in case where due to the effects of disturbance effects, the dynamic violations become unavoidable, in the present invention, the optimizer would do its best to keep the violation to the minimum.

It is envisaged that the above mentioned dynamic MPC will be applied in a "receding horizon" approach, in that the first of the dynamic moves of each of the manipulated variables will be applied and the entire calculation of optimization would be repeated taking into account the feedback of the actual process response including the effects of any measured and unmeasured disturbance effects. However, at every control cycle, the dynamic MPC would avoid the dynamic violation of the controlled variables while progressively moving the process towards its optimal steady state target condition.

Those skilled in the art would appreciate that the above method of optimization of the Dynamic MPC can be adapted suitably to work with what is commonly known as ramp type process behavior such as accumulator level.

It is interesting to examine Constraint 2.4 a little further. It encapsulates two-sided constraints involving low-side dynamic violation and high-side dynamic violation. The two-sided inequality constraints produce an interesting improvement to the performance of the Dynamic MPC. In FIG. 4.2, an interesting case of what can happen with the Dynamic MPC is shown. In this case, the optimal steady state target of the controlled variable 421 is initially adjusted lower to ensure that there would not be any high-limit dynamic violation of the controlled variable 422. That is to say in this case, the dynamic move constrains the steady state optimal target. If the predicted high-limit dynamic violation was due to any adverse disturbance effects previously, as the disturbance effects die down, the dynamic MPC would progressively push the optimal steady target back towards the high limit 423. This temporary adjustment of the optimal steady state target to avoid the dynamic violation is a unique feature of the Dynamic MPC that is not possible with the prior art MPC.

In contrast, as shown in FIG. 4.3, the prior art MPC, would push for the optimal steady state target to the high limit at once with no regard to the predicted dynamic violation 431. In fact, this aggressive push to the final steady state target right away would induce its own dynamic violation in addition to the original dynamic violation originating due to a disturbance effect which could further induce dynamic instability.

FURTHER EMBODIMENTS OF PRESENT INVENTION

A first alternate reduced form of the Dynamic MPC as presented in this invention can be arrived by adopting the following changes to the general form presented above. For instance, for the purpose of the optimization, the process dynamic response is considered as $(C, C^d) = G(M, D^d)$, that is replacing $M^d$ by M. In other words, excluding $M^d$ as part of the optimization solution. This would lead to the objective function to become $$J = F(M, C, D^d, C^d) + \Sigma\Sigma P_c^l C^l + \Sigma\Sigma P_c^h C^{hn}$$

In this reduced form, the dynamic violation of the controlled variables resulting from the steady state solution is avoided or minimized. However, the controlled variables can still violate dynamically later due to the dynamic moves of the manipulated variables determined externally. This reduced form can be advantageous in the circumstances involving a large problem thereby saving on the computational time. With this form, the corresponding manipulated variables dynamic constraints of 2.3-2.3.7 are eliminated from the optimization as well.

A second alternate reduced form of the Dynamic MPC described above can be arrived at by adopting $(C, C^d) = G(M^d, D^d)$ as $(C^d) = G(M^d, D^d)$ and adopting $J = F(D^d, M^d, C^d) + \Sigma\Sigma P_c^l C^l + \Sigma\Sigma P_c^h C^{hn}$. In this form, obviously the steady state solution is done externally in determination of (C, M). However, the external steady solution is incorporated by a modification Constraints 2.3.6 as $$\Sigma\Delta M_j^k = M_j^s - M_j^* \qquad 2.3.6.1$$

and Constraints 2.2 is modified as $$C^s \leq C \leq C^s \qquad 2.2.1$$

where
  $M_j^s$ is the steady state solution value determined separately
  $C^s$ is the steady state solution value determined separately
  In this form, dynamic violation of the controlled variables are avoided or minimized in the same manner as in the full form formulation except that the steady state value of the manipulated variables and the controlled variables required in the constraints set is given, whereas in the full form formulation the steady state values are determined along with the dynamic moves. This form of dynamic MPC can still be useful in practice involving a large process with a number of controllers wherein each of the controller in themselves adopt this proposed reduced form of dynamic optimization while responding to the steady state solution determined separately.

Dynamic Feed Forward Constraints

A further embodiment of the present invention is disclosed wherein how $D^d$ is considered within the optimization. For a typical MPC application, $D^d$ is considered to be measured disturbance vector at the start of control cycle with no future values known or assigned. However, within the optimization formulation proposed in the present invention, $D^d$ can have future time dependent values and in particular of the same horizon as the dynamic manipulated variables. In which case, this affords interesting and useful applications. In one particular situation, where if $D^d$ relates to as feed forward variables relating to an upstream MPC, then $D^d$ provides for inclusion of not only the current dynamic moves of the upstream MPC but also of the future dynamic moves determined by it in determination of the downstream MPC dynamic moves. In other words, the downstream dynamic MPC not only responds to the current dynamic moves made by the upstream dynamic MPC but also responds to all of the future dynamic moves planned by the upstream dynamic moves. This kind of feed forward effects of the upstream dynamic moves on to the downstream dynamic MPC is certainly of totally unexpected of in the prior art. This is an entirely novel way of managing interactions of two interconnected MPCs hitherto not considered let alone tackled in the prior art at all.

In another situation, where $D^d$ can relate to what can be characterized as "true environmental/external" feed forward variables with known dynamic changes that can occur such as during a planned shutdown or surge.

In summary, $D^d$ can have future values and doing so affords a number of novel applications and capabilities within the framework of the dynamic optimization presented herein.

Flexible Embedded Dynamic Model Predictive Control

A further embodiment of the present invention relates to what is described herein as "Embedding" of parts of a model predictive control as a dynamic model predicative control within the framework of the dynamic optimization. This is arrived at by recognizing that the variables set $(M^d, C^d)$ need not include all of the variables of the set (M, C). That is to say only a selected manipulated variables and associated selected controlled variables be included in $(M^d, C^d)$ and for this, the partially selected set of $(M^d, C^d)$ can be used within the proposed formulation above. What this means is that at times, a part of a large of model predicative control can be selected to have a full dynamic treatment of the selected manipulated variables and the controlled variables. In other words, dynamic embedding within a large model predicative control can be done dynamically under varying plant-operating conditions. For example at or near valve saturation of certain flows or controller outputs, this dynamic embedding can be done in real time to improve robustness of a larger model predictive controller. This is entirely a new capability of a MPC that is not present in the prior art. In other words, within the framework of the optimization method proposed in this invention, a mix and match method of including dynamic and steady state optimization can be performed under varying conditions. What this means is that the dynamic embedding of parts of a large MPC can be done when specific plant conditions warrant, as in case of unsafe operating conditions. This is also useful where solving a large MPC with dynamic optimization can be prohibitively computationally very expensive and slow in response in real time.

An example of this embodiment of the present invention demonstrating embedding of dynamic model predicative control is present. In FIG. 6 a schematic diagram of a typical DeButanizer process unit is depicted. In FIG. 7 a list of manipulated variables, controlled variables and feed forward variables is presented. As shown in FIG. 6, the process unit control includes a pressure-regulating loop along with the rest of control of the unit. A large MPC controller is constituted to include all of the variables listed in FIG. 7 including the pressure-regulating loop with 10 manipulated variables, 17 controlled variables and 2 disturbance variables. As a demonstration of the application of the embedded dynamic MPC of this invention, the variables relating to the pressure regulation such as U8PC01_OP as a MV and U8PC01_PV as a CV are selected to be treated for embedded dynamic optimization within the context of the rest of other variables steady state optimization only. In this instance, the reason for the pressure control loop being selected for embedded dynamic optimization would be that as the feed rate to the unit is pushed to its maximum value, the pressure control out put U8PC01_OP would saturate. In many instances, to maintain the stability of the unit at the maximum rate of feed, it is imperative that the pressure remains under control at all times. Unit pressure tends to affect reboiler temperature which in turn would affect the quality of both top and bottom product streams. Therefore, controlling the pressure is often critical to overall performance. For this reason, the pressure control loop would be selected for dynamic embedding.

In FIG. 8 a comparison of performance the unit with and without dynamic embedding of the pressure control loop is shown. In particular, the performance of the quality of top and bottom product stream is compared showing the improved performance under dynamic embedding. Notice that with dynamic embedding of pressure control loop results in improved performance on control of quality of products even though the quality variables themselves were not embedded dynamically. This improvement is resulting from an indirect effect of dynamic moves and dynamic controlled variables control of the pressure regulation loop. The results of comparison are produced using a MPC simulation package from Unified Control Technology Corp of Princeton, N.J. 08540. This example demonstrates the underlying beneficial effects of the invention in improving a large MPC performance. This shows even a partial dynamic embedding can result in improved performance.

In summary, the above disclosed general form of the dynamic MPC and its reduced forms provide a rich variety of formulations that could be used in dealing with a large control system application involving a complex process with a number of MPCs. The design of which would be based on consideration of judicious engineering balancing performance against computational time and complexity.

The optimization problem as described above can be solved with available solver today. The more complex and bigger the process is the more detailed computational steps would be required. For a linear dynamic system, a linear programming method of optimization incorporating the formulation as described herein would yield a combined steady state and dynamic control moves results for a model predictive controller. It is envisaged that for a non-linear dynamical system, appropriate non-linear optimization method would be employed.

It will be understood by those skilled in the art that various modifications and changes may be made to the present invention without departure from the scope.

What I claim:

1. A method of operation of dynamic model predictive controller for controlling and optimizing the operation of a process having a plurality of independently controlled, manipulated variables, at least one controlled variables and none or more disturbance variables; said method of operation of dynamic model predictive controller comprising the steps of:
  a) determining simultaneously dynamic moves of said manipulated variables and steady state values of said manipulated variables and said controlled variables as result of an optimization process combining steady state and dynamic state wherein a predetermined number of dynamic moves of said manipulated variables are determined along with steady state values of said manipulated variables and said controlled variables in accordance with steady state constraints relating to said manipulated variables and said controlled variables as well as dynamic constraints relating to said manipulated variables and said controlled variables including where appropriate relating to said disturbance variables; and
  b) performing a receding horizon form of control wherein said optimization is performed at successive time interval by monitoring and feedback of process responses resulting from the control actions applied at previous time intervals;
  wherein said optimization process further comprises an objective function J in the form of $J = F(M, C, D^d, M^d, C^d) + \Sigma\Sigma P^l{}_c C^l + \Sigma\Sigma P^h{}_c C^h$ wherein F is some optimizing function for the process over the time horizon of time to steady state for said process, $M^d$ is dynamic values of manipulated variables over a predetermined time horizon, M is steady state value of said manipulated variables, $C^d$ is dynamic values of controlled variables over a time horizon to steady state, C is steady state value of said controlled variables, $D^d$ is a dynamic value vector of said disturbance variables over a time horizon no greater than said time horizon of dynamic values of said manipulated variables, and wherein further the process is considered to be a dynamic system, and said controlled variables response both in steady state and dynamic is characterized by $(C, C^d) = G(M^d, D^d)$, $P^h{}_c$ is a penalty value to be applied for the controlled variable violating its high limit dynamically, further $C^h{}_i$ is high limit dynamic violation variables of said controlled variables, $C_i$ and $C^l{}_i$ is low limit dynamic violation variables of said controlled variables, $C_i$, the aforementioned control variables penalty relate to either economic criteria and/or safety criteria depending on the nature and characteristics of the controlled variable.

2. The method recited in claim 1, wherein said steady state constraints comprise $$M^l \leq M \leq M^h$$

$$C^l \leq C \leq C^h$$

Where
M is steady state value of said manipulated variables,
C is steady state value of said controlled variables,
$M^l$ is low limit of said manipulated variables, M,
$M^h$ is low limit of said manipulated variables, M,
$C^l$ is low limit of said controlled variables, C,
$C^h$ is high limit of said controlled variables, C.

3. The method recited in claim 1, wherein said dynamic manipulated variables constraints comprise $$M^l \leq M^d \leq M^h$$

$$-\Delta M_j^l \leq \Delta M_j \leq \Delta M_j^h$$

$$0 \leq \Delta M_j^+ \leq \Delta M_j^h$$

$$0 \leq \Delta M_j^- \leq \Delta M_j^l$$

$$\Delta M_j = \Delta M_j^+ - \Delta M_j^-$$

$$-(1-k_{MV}/k)\Delta M_j^l \leq \Delta M_{j,k} \leq (1-k_{MV}k)\Delta M_j^h \text{ for } k=1 \ldots k_{MV}$$

where
$\Delta M_j^1 = M_j^1 - M_j^*$ where $M_j^*$ being Current Value of $M_j$,
$\Delta M_j$ is dynamic move vector of manipulated variable, j,
$\Delta M_j^+$ is positive dynamic move vector of manipulated variable, j,
$\Delta M_j^-$ is negative dynamic move vector of manipulated variable, j,
$\Delta M_j^l$ is low limit of dynamic move of manipulated variable, j,
$\Delta M_j^h$ is high limit of dynamic move of manipulated variable, j,
$\Delta M_j^k$ is dynamic control move of said manipulated variable $M_j$ at time k from now,
$M_j$ is the optimal steady state value of said manipulated variable,
$M_j^*$ is the current value of said manipulated variable, j.

4. The method recited in claim 1, wherein said dynamic constraints of said controlled variables comprise $$C^l <= C_i^k <= C^h$$

$$-\theta \leq C_i^k - C_i^{k\,ref} - C_i^h + C_i^l \leq \theta$$

$$0 \leq C_i^h$$

$$0 \leq C_i^l$$

where
$C_i^k$ is predicted value of said Controlled Variable, $C_i$ at k time interval from now,
$C_i^{k\,ref}$ is desired value of said Controlled Variable, $C_i$ at k time interval from now,
$C_i^h$ is high limit dynamic violation variables of said Controlled Variable, $C_i$,
$C_i^l$ is low limit dynamic violation variables of said Controlled Variable, $C_i$,
$C_i^{k*}$ is dynamic value of said Controlled Variable $C_i$ at time k based on the past process condition,
θ is a permitted tolerance for deviation of the predicted dynamic value of said controlled variable from its reference path, a small number, k relates to future time from now on, $k=1 \ldots k_{MV} \ldots k_{CV}$,
$k_{MV}$ relates to the control horizon for manipulated variables moves, no manipulated variables to be applied beyond this time horizon so as to permit said controlled variables to attain their steady state,
$k_{CV}$ relates to the time to steady state for said controlled variables, it would be the longest time to steady state for the changes in said manipulated variables, M plus the longest control horizon.

5. The optimizing function, F (M, C, D, $M^d$, $C^d$) as recited in claim 1 can be of one of simple form such as $P_m M + P_c C$ devoid of effects of dynamic values of said manipulated variables and said controlled variable on optimizing function F(), where
$P_m$ is the price value for said manipulated variables, typically a negative value representing cost and a positive value representing benefit,
$P_c$ is the price value for said controlled variables, typically a negative value-representing penalty and a positive value representing benefit.

6. Said controlled variables dynamic response, (C, $C^d$)=G ($M^d$, $D^d$) as recited in claim 1 can be one of linear dynamic form represented as $C_i^k = C_i^{k*} + \Sigma g_{i,j}(M_j - M_j^*)$ for steady state, and as $C_i^k = C_i^{k*} + \Sigma g_{i,j}^k \Delta M_j^k + \Sigma g_{i,l}^k \Delta D_l^k$ for dynamic response
Where
$C_i^*$ is the currently predicted steady state value of said controlled variable based on past changes in said manipulated variables and said disturbance variables,
$C_i$ is the steady state value of said controlled variables,
$C_i^k$ is predicted value of said Controlled Variable, $C_i$ at k time interval from now,
$C_i^{k*}$ is dynamic value of said Controlled Variable $C_i$ at time k based on the past process condition,
$g_{i,j}$ is the steady state gain of the step response model of said Controlled Variable, $C_i$ for a unit change in said manipulated variable, $M_j$,
$g_{i,j}^k$ is the step response coefficient of the process model of Controlled Variable, $C_i$ for a unit change in said manipulated variable, $M_j$,
$\Delta D_l^k$ is change in $D_l$ at time k,
$g_{i,l}^k$ is the step response coefficient of the process model of Controlled Variable, $C_i$ for a unit change in said disturbance variable, $D_l$.

7. A method of operation of dynamic model predictive controller for controlling and optimizing the operation of a process having a plurality of independently controlled, manipulated variables, at least one controlled variables and none or more disturbance variables; said method of operation of dynamic model predictive controller comprising the steps of:

a) determining steady state values of said manipulated variables and said controlled variables as result of an optimization process combining steady state and dynamic state wherein with steady state values of said manipulated variables and said controlled variables in accordance with steady state constraints relating to said manipulated variables and said controlled variables and dynamic state constraints of said controlled variables including where appropriate relating to said disturbance variables; and b) performing a receding horizon form of control wherein said optimization is performed at successive time interval by monitoring and feedback of process responses resulting from the control actions applied at previous time intervals;

wherein said optimization process further comprises an objective function J in the form of J=F (M, C, $D^d$, $C^d$)+

$\Sigma\Sigma P^l_c C^l + \Sigma\Sigma P^h_c C^h$ wherein F is some optimizing function for the process over the time horizon of time to steady state for the process, M is a vector of steady state value of said manipulated variables, C is a vector of steady state value of said controlled variables, $D^d$ is a vector of disturbance variables, $C^d$ is vector dynamic values of said controlled variables over a time horizon to steady state, $P^l_c$ is a penalty value to be applied for the controlled variable violating its low limit dynamically, $P^h_c$ is a penalty value to be applied for the controlled variable violating its high limit dynamically, and wherein further the process is considered to be a dynamic system, and said controlled variables dynamic response is characterized by $(C, C^d) = G(M, D^d)$, further $C^h_i$ is high limit dynamic violation variables of said controlled variables, $C_i$ and $C^l_i$ is low limit dynamic violation variables of said controlled variables, $C_i$.

8. The method recited in claim 7, wherein said steady state constraints comprise $$M^l \leq M \leq M^h$$

$$C^l \leq C \leq C^h$$

Where

M is steady state value of said manipulated variables,
C is steady state value of said controlled variables,
$M^l$ is low limit of said manipulated variables, M,
$M^h$ is low limit of said manipulated variables, M,
$C^l$ is low limit of said controlled variables, C,
$C^h$ is high limit of said controlled variables, C.

9. The method recited in claim 7, wherein said dynamic constraints of said controlled variables comprise $$C^l \leq C_i^k \leq C^h$$

$$-\theta \leq C_i^k - C_i^{k\,ref} - C^h_i + C^l_i \leq \theta$$

$$0 \leq C^h_i$$

$$0 \leq C^l_i$$

where $C_i^k$ is predicted value of Controlled Variable, $C_i$ at k time interval from now,
$C_i^{k\,ref}$ is desired value of Controlled Variable, $C_i$ at k time interval from now,
$C^h_i$ is high limit dynamic violation variables of the Controlled Variable, $C_i$,
$C^l_i$ is low limit dynamic violation variables of the Controlled Variable, $C_i$,
$C_i^{k*}$ is dynamic value of Controlled Variable $C_i$ at time k based on the past process condition,
$\theta$ is a permitted tolerance for deviation of the predicted dynamic value of the controlled variable from its reference path, a small number,
k relates to future time from now on, $k=1 \ldots k_{MV} \ldots k_{CV}$,
$k_{MV}$ relates to the control horizon for manipulated variables moves, no manipulated variables to be applied beyond this time horizon so as to permit said controlled variables to attain their steady state,
$k_{CV}$ relates to the time to steady state for said controlled variables, it would be the longest time to steady state for the changes in said manipulated variables, M plus the longest control horizon.

10. The optimizing function, F (M, C, D, $C^d$) as recited in claim 7 can be of one of simple form such as $P_m M + P_c C$ devoid of the effects of dynamic values of said manipulated variables and said controlled variables, where $P_m$ is the price value for said manipulated variables, typically a negative value representing cost and a positive value representing benefit,
$P_c$ is the price value for said controlled variables, typically a negative value-representing penalty and a positive value representing benefit.

11. Said controlled variables dynamic response, $(C, C^d) = G(M, D^d)$, as recited in claim 7 can be one of linear dynamic form represented as $C_i = C_i^* + \Sigma g_{i,j}(M_j - M_j^*)$ for steady state, and as $C_i^k = C_i^{k*} + \Sigma g_{i,j}(M_j - M_j^*) + \Sigma g_{i,l}^k \Delta D_l^k$ for dynamic response Where $C_i^*$ is the currently predicted steady state value of the controlled variable based on past changes in said manipulated variables and the disturbance variable,
$C_i$ is the steady state value of said controlled variables,
$C_i^k$ is predicted value of Controlled Variable, $C_i$ at k time interval from now,
$C_i^{k*}$ is dynamic value of Controlled Variable $C_i$ at time k based on the past process condition,
$g_{i,j}$ is the steady state gain of the step response model of the Controlled Variable, $C_i$ for a unit change in said manipulated variable, $M_j$,
$\Delta D_l^k$ is change in $D_l$ at time k,
$g_{i,lj}^k$ is the step response coefficient of the process model of Controlled Variable, $C_i$ for a unit change in said disturbance variable, $D_l$.

12. A method of operation of dynamic model predictive controller for controlling and optimizing the operation of a process having a plurality of independently controlled, manipulated variables, at least one controlled variables and none or more disturbance variables; said method of operation of dynamic model predictive controller comprising the steps of:

a) determining dynamic moves of said manipulated variables as result of an optimization process combining steady state and dynamic state wherein a predetermined number of dynamic moves of said manipulated variables are determined to satisfy given/known steady state values of said manipulated variables and said controlled variables in accordance with steady state constraints relating to said manipulated variables and said controlled variables as well as dynamic constraints relating to said manipulated variables and said controlled variables including where appropriate relating to said disturbance variables; and b) performing a receding horizon form of control wherein said optimization is performed at successive time interval by monitoring and feedback of process responses resulting from the control actions applied at previous time intervals;

wherein said optimization process further comprises an objective function J in the form of $J = F(D^d, M^d, C^d) + \Sigma\Sigma P^l_c C^l + \Sigma\Sigma P^h_c C^h$, wherein F is some optimizing function for the process over the time horizon of time to steady state for the process, $D^d$ is a vector of disturbance variables, $M^d$ is vector of dynamic values of said manipulated variables over a predetermined time horizon, $C^d$ is vector dynamic values of said controlled variables over a time horizon to steady state, $P^l_c$ is a penalty value to be applied for the controlled variable violating its low limit dynamically, $P^h_c$ is a penalty value to be applied for the controlled variable violating its high limit dynamically, and wherein further the process is considered to be a dynamic system, and said controlled variables dynamic response is characterized by $(C, C^d) = G$ ($M^d$, $D^d$), further $C^h_i$ is high limit dynamic violation variables of said controlled variables, $C_i$, and $C^l_i$ is low limit dynamic violation variables of said controlled variables, $C_i$.

13. The method recited in claim 12, wherein said dynamic manipulated variables constraints comprise $$M^l \leq M^d \leq M^h$$

$$-\Delta M^l_j \leq \Delta M_j \leq \Delta M^h_j$$

$$0 \leq \Delta M^+_j \leq \Delta M^h_j$$

$$0 \leq \Delta M^-_j \leq \Delta M^l_j$$

$$\Delta M_j = \Delta M^+_j - \Delta M^-_j$$

$$\Sigma \Delta M_j = M^s - M^0$$

where $\Delta M^1_j = M^1_j - M^*_j$ where $M^*_j$ being Current Value of $M_j$
$\Delta M_j$ is dynamic move vector of manipulated variable, j,
$\Delta M^+_j$ is positive dynamic move vector of manipulated variable, j,
$\Delta M^-_j$ is negative dynamic move vector of manipulated variable, j,
$\Delta M^l_j$ is low limit of dynamic move of manipulated variable, j,
$\Delta M^h_j$ is high limit of dynamic move of manipulated variable, j,
$\Delta M^k_j$ is dynamic control move of said manipulated variable $M_j$ at time k,
$M_j$ is the optimal steady state value of said manipulated variable,
$M^*_j$ is the current value of said manipulated variable, j.

14. The method recited in claim 12, wherein said dynamic constraints of said controlled variables comprise $$C^s \leq C \leq C^s$$

$$C^l <= C^k_i <= C^h$$

$$-\theta \leq C^k_i - C^{k\,ref}_i - C^h_i + C^l_i \leq \theta$$

$$0 \leq C^h_i$$

$$0 \leq C^l_i$$

where
$C^k_i$ is predicted value of Controlled Variable, $C_i$ at k time interval from now,
$C^{k\,ref}_i$ is desired value of Controlled Variable, $C_i$ at k time interval from now.

$C^h_i$ is high limit dynamic violation variables of the Controlled Variable, $C_i$,
$C^l_i$ is low limit dynamic violation variables of the Controlled Variable, $C_i$,
$C^{k*}_i$ is dynamic value of Controlled Variable $C_i$ at time k based on the past process condition,
$C^s$ is steady state target of said controlled variables as given,
$\theta$ is a permitted tolerance for deviation of the predicted dynamic value of the controlled variable from its reference path, a small number,
k relates to future time from now on, $k=1 \ldots k_{MV} \ldots k_{CV}$,
$k_{MV}$ relates to the control horizon for manipulated variables moves, no manipulated variables to be applied beyond this time horizon so as to permit said controlled variables to attain their steady state,
$k_{CV}$ relates to the time to steady state for said controlled variables, it would be the longest time to steady state for the changes in said manipulated variables, M plus the longest control horizon.

15. The optimizing function, F ($D^d$, $M^d$, $C^d$) as recited in claim 12 can be of one of simply null form, whereby said dynamic optimization is performed to satisfy steady state value of said manipulated variables and said controlled variables determined exogenously.

16. Said controlled variables dynamic response, $C^d = G(M^d, D^d)$ as recited in claim 12 can be one of linear dynamic form represented as $C_i = C^*_i + \Sigma g_{i,j}(M_j - M^*_j)$ for steady state, and as $C^k_i = C^{k*}_i + \Sigma g^k_{i,j} \Delta M^k_j + \Sigma g^k_{i,l} \Delta D^k_l$ for dynamic response
Where
$C^*_i$ is the currently predicted steady state value of the controlled variable based on past changes in said manipulated variables and the disturbance variable,
$C_i$ is the steady state value of said controlled variables,
$C^k_i$ is predicted value of Controlled Variable, $C_i$ at k time interval from now,
$C^{k*}_i$ is dynamic value of Controlled Variable $C_i$ at time k based on the past process condition,
$g_{i,j}$ is the steady state gain of the step response model of the Controlled Variable, $C_i$ for a unit change in said manipulated variable, $M_j$,
$g^k_{i,j}$ is the step response coefficient of the process model of Controlled Variable, $C_i$ for a unit change in said manipulated variable, $M_j$,
$\Delta D^k_l$ is change in $D_l$ at time k,
$g^k_{i,l}$ is the step response coefficient of the process model of Controlled Variable, $C_i$ for a unit change in said disturbance variable, $D_l$.

\* \* \* \* \*